(12) United States Patent
Mohammed

(10) Patent No.: US 7,588,285 B2
(45) Date of Patent: Sep. 15, 2009

(54) CARGO BOX FOR PICKUP TRUCK AND METHOD FOR MAKING SAME

(75) Inventor: Ismail Mohammed, Farmington Hills, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 0 days.

(21) Appl. No.: 11/860,105

(22) Filed: Sep. 24, 2007

(65) Prior Publication Data

US 2009/0079230 A1     Mar. 26, 2009

(51) Int. Cl.
*B62D 33/02* (2006.01)
(52) U.S. Cl. ..................... 296/183.1; 296/30
(58) Field of Classification Search ........... 296/183.1, 296/183.2, 181.1, 30, 37.6, 36; 180/89.1
See application file for complete search history.

(56) References Cited

U.S. PATENT DOCUMENTS

| | | | | |
|---|---|---|---|---|
| 5,660,427 A | * | 8/1997 | Freeman et al. | 296/190.08 |
| 6,742,832 B1 | * | 6/2004 | Miskech et al. | 296/183.1 |
| 2003/0001409 A1 | * | 1/2003 | Semple et al. | 296/183 |
| 2007/0085378 A1 | * | 4/2007 | Hanson | 296/183.1 |
| 2008/0042469 A1 | * | 2/2008 | McNulty et al. | 296/183.1 |

OTHER PUBLICATIONS

Compilation of photographs taken in Apr. 2007 of other original equipment manufacturers' truck cargo boxes.

* cited by examiner

*Primary Examiner*—Jason S Morrow
(74) *Attorney, Agent, or Firm*—Young Basile

(57) ABSTRACT

A cargo box for a pickup truck having a header panel with integral welding braces or struts. The cargo box has left and right sidewalls defining the left and right sides of the cargo box, respectively, a tailgate attached to the rear end of at least one of the left and right sidewalls, a cargo box floor spanning the left and right sidewalls, and a header panel having a main body spanning the front ends of the left and right sidewalls to form a front side of the cargo box. The header panel has integral left and right lateral sides extending from and integral with its main body and these are welded directly to the left and right sidewalls without any intervening brace above the level of the cargo bed floor. Left and right braces are welded to the lower end of the header panel and the left and right sidewalls at and below the cargo bed floor, so that a majority of the mass of the brace is below the lower edge of the header panel.

25 Claims, 3 Drawing Sheets

CARGO BOX FOR PICKUP TRUCK AND METHOD FOR MAKING SAME

FIELD OF THE INVENTION

This invention relates generally to pickup trucks having a cargo box and more particularly to a novel header panel structure and method for joining the header panel to the sidewalls.

BACKGROUND OF THE INVENTION

Light trucks also known as pickup trucks include a cargo box or bed constructed with a floor, a header positioned at the front of the cargo box, two sidewalls and a tailgate. The upper edges of the header and sidewalls are substantially at the same height, but the sidewalls extend below the lower edge of the header and the floor.

The header is traditionally joined to the sidewalls by large, vertically oriented braces which can span the entire height of the header panel, which are welded to the lateral ends of the header and the front ends of the sidewalls. The braces each include an upper portion welded to both the header and the sidewall and a lower portion adjacent to the sidewall that extends below the header and the floor. Typically, the braces are also welded to the bottom of the sidewalls. Often, separate tie rods or attachment brackets and/or straps are necessary to connect the lower portion of the header panel to the lower portion of the brace. An additional reinforcement or bolster may be added to the header panel to accommodate the tie rod. Due to the durability requirements to support the lower ends of the vehicle side panels, the tie rods and lower portions of the vertical braces had to be of substantial gage which for the entire brace, both above and below the lower edge of the header panel. In some instances, prior designs required welding of four thicknesses of sheet metal which is burdensome from an assembly standpoint. In such instances, weld access or clearance points often need to be created through the sheet metal which may weaken the metal and welds. The combination of all of these separate pieces, and the required durability and gage of the large brace and/or separate reinforcements, added significant weight and complexity for the manufacture and assembly of prior cargo boxes and lessen the strength of the joints.

SUMMARY OF INVENTION

In an example of the inventive passenger vehicle cargo box, a header panel is provided having a generally planar main body and lateral sides that span the distance between the side panels of the cargo box and attach directly to the cargo box side panels. The cargo box further includes a brace positioned at both ends of the header panel and attaches to the lower edge of the header panel. The lower portion of the cargo box side panels attach to the downwardly extending sides of the braces to support the lower portions of the side panels extending below the cargo box floor.

In one example of the invention, the header panel includes a first and second side panel engaging surfaces to accommodate and attach to a double-wall cargo box side panel structure.

In another example of the invention, the braces attached to the lower ends of the header panel are made from a higher gage material than the header panel.

In another example of the invention, the braces are positioned and attached so that the majority of the mass of the braces are positioned below the header panel and cargo box floor.

Difficulties have been experienced in manufacturing and assembling the many pieces of structural sheet metal that come together in the corner areas of the cargo box. These components typically must overlap and weld together through coordinated mating surfaces and weld flanges. For structural integrity and efficiency in welding, often three thicknesses, or in places four thicknesses, of sheet metal may need to be spot welded together which creates difficulties in assembly and may weaken the sheet metal and welds. Alternatively mechanical fasteners such as bolts must be used which adds parts and assembly processes. The proper locational alignment of all of these separate pieces further adds to the difficulties to produce a structurally strong and dimensionally accurate cargo box in an efficient manner.

BRIEF DESCRIPTION OF THE DRAWINGS

The description herein makes reference to the accompanying drawings wherein like reference numerals refer to like parts throughout the several views, and wherein.

DETAILED DESCRIPTION OF THE EMBODIMENTS

Figure 1:
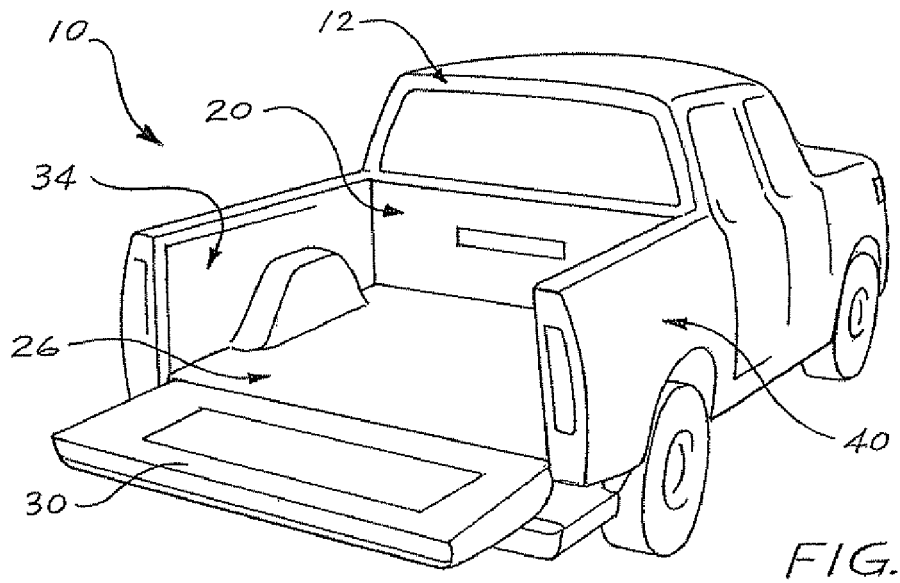
FIG. 1 is a rear perspective view of a pickup truck having a cargo box in accordance with a first embodiment of the invention.
Figure 2:
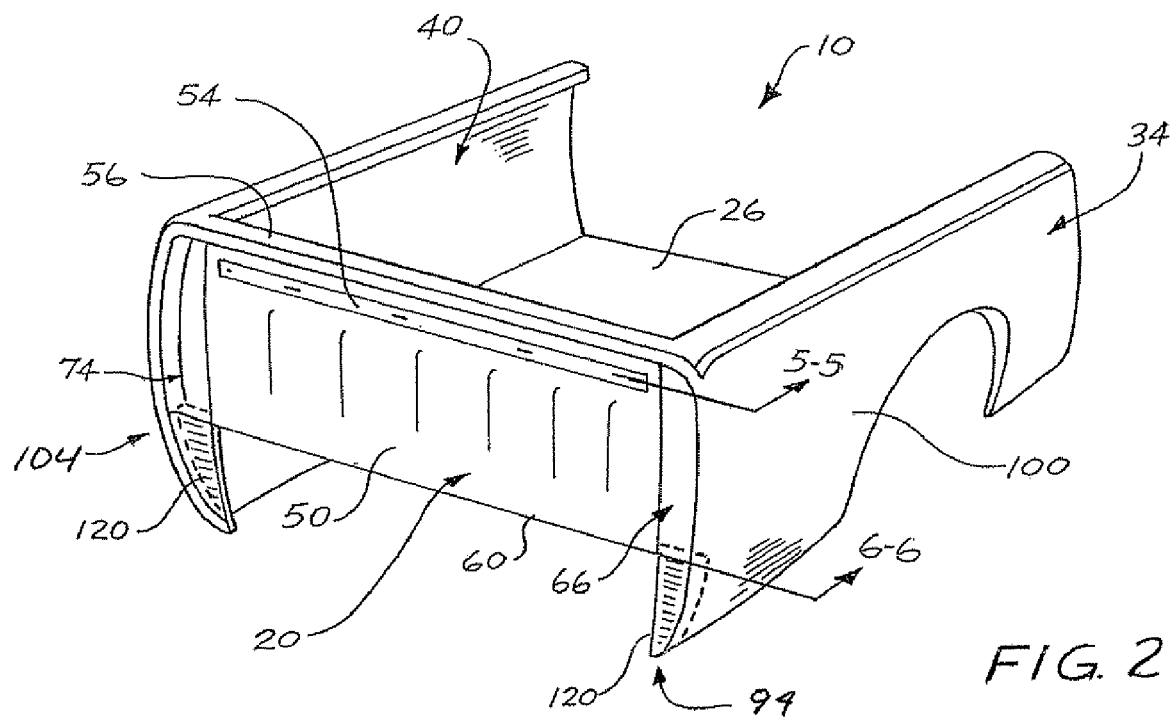
FIG. 2 is a front perspective view of the cargo box of FIG. 1.

Examples of the cargo box and method of assembly are shown in FIGS. 1-6. Referring to FIGS. 1 and 2, a cargo box or truck bed 10 is shown in use with a truck generally having a cab 12 typically used in pickup or utility trucks. Cargo box 10 generally includes a header panel 20, a floor 26, a tailgate 30, a left sidewall 34 and a right sidewall 40.

Figure 3:
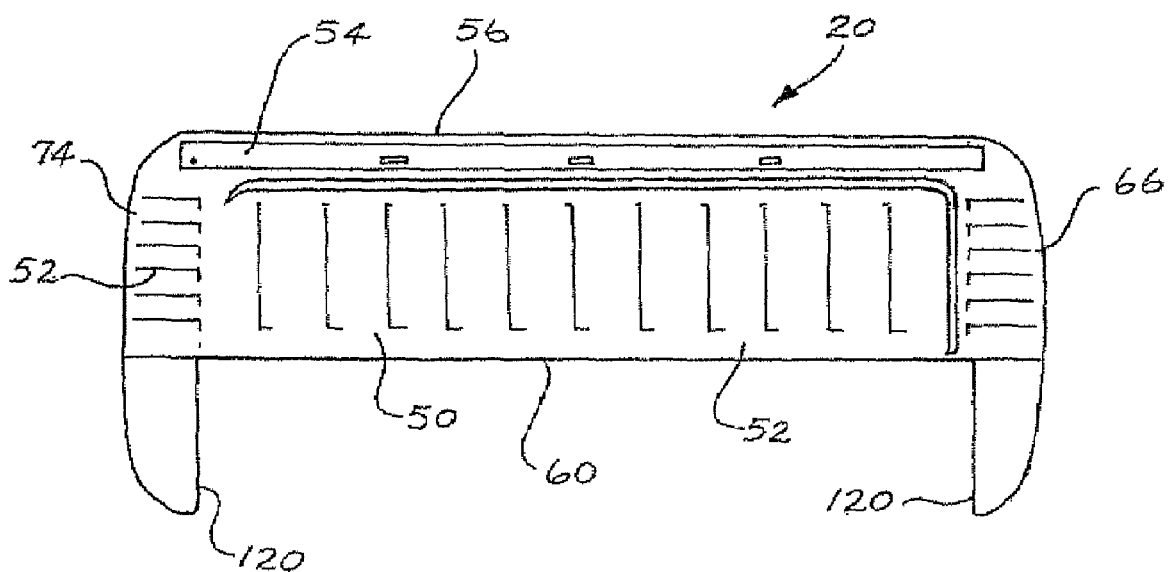
FIG. 3 is a front view of a header panel defining the front end of the cargo box of FIG. 1
Figure 4:
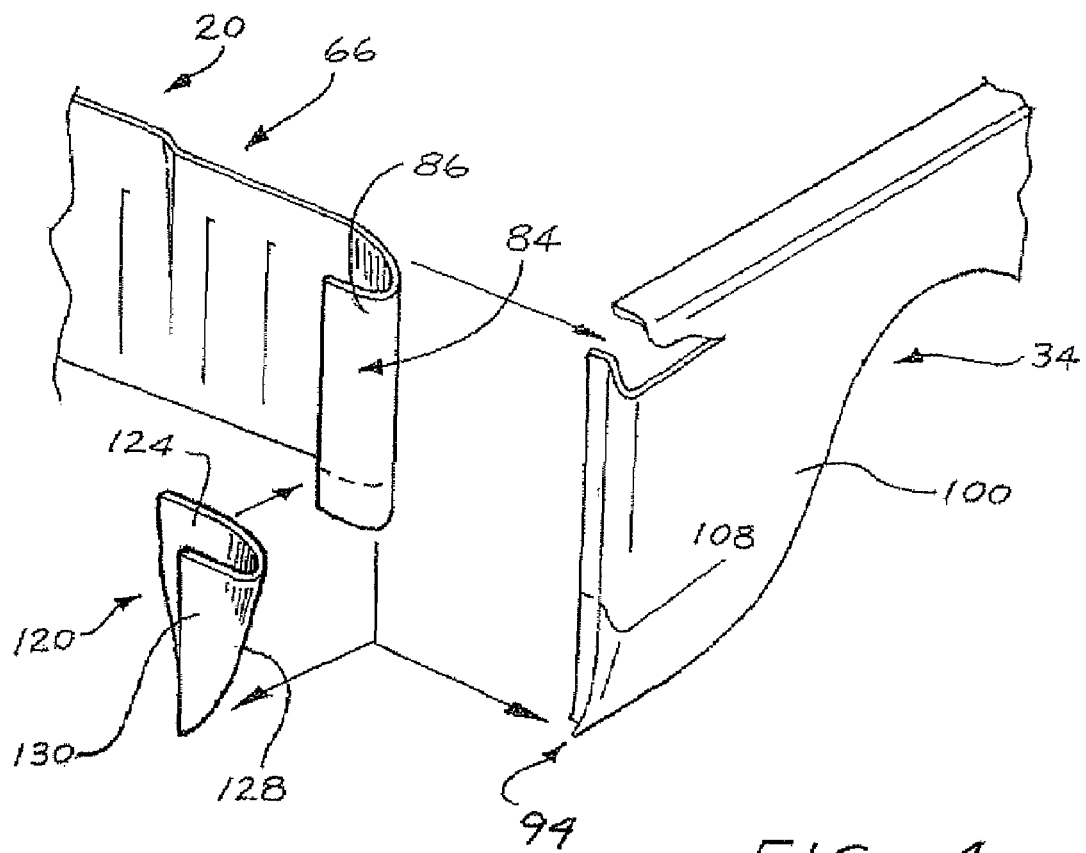
FIG. 4 is an exploded perspective view of a portion of the cargo box of FIG. 1 showing structure for joining of the header and left-hand sidewall.

As best seen in FIGS. 2-4, in one example, header panel 20 includes a main body portion 50 positioned at the front of the cargo box 10. Body portion 50 is generally planar, but may have stiffening ribs 52 or other formations for stiffness or functionality such as tie down points or for other typical accessories. Header panel 20 may include one or more reinforcement panels 54, shown positioned on a forward facing side of header panel 20 and extending laterally across an upper edge 56. Exemplary reinforcement 54 may be in the form of brackets, other panels or other plates known by those skilled in the art. Header panel 20 further includes a lower edge 60 across the bottom of header panel 20, a left lateral side portion 66 and a right lateral side portion 74. In a preferred example, header panel 20 is made from cold rolled low carbon steel that is formed through stamping. Header panel 20 may be about 0.7 to 1.5 millimeters (mm) thick and is preferably about 1.0 mm thick. It is understood that other materials and thickness may be used to suit the particular application and performance requirements.

Figure 5:
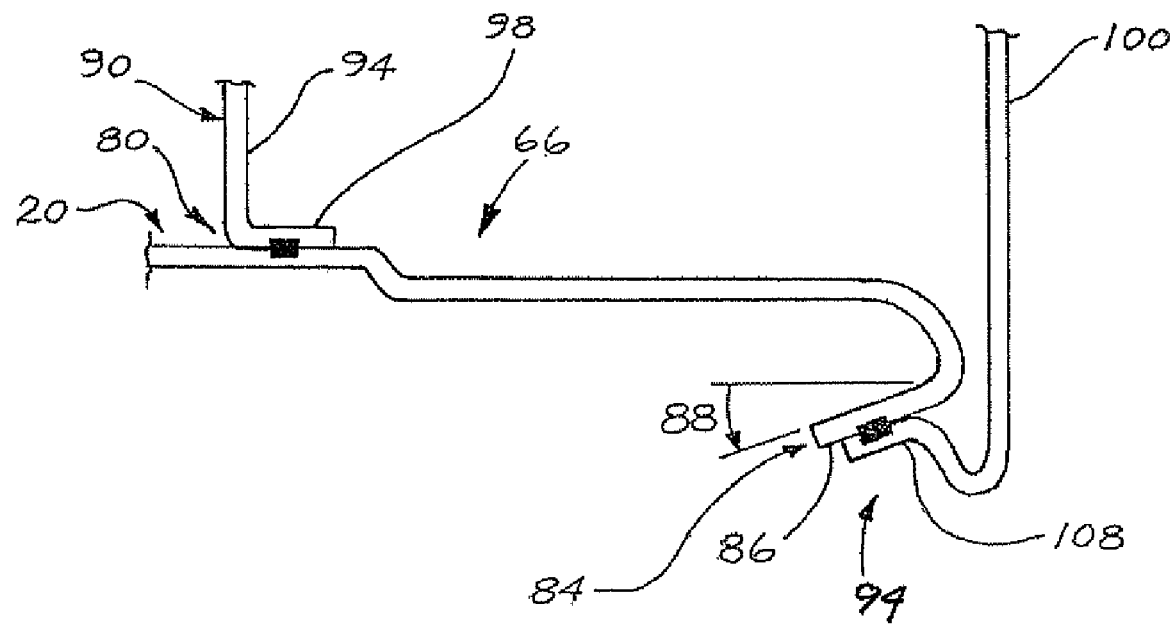
FIG. 5 is a cross-sectional view of the cargo box taken along line 5-5 in FIG. 2.

As best seen in FIGS. 2, 4 and 5, in a preferred example, left 34 and right 40 sidewalls include a front end 94 and 104 respectively, and are a double-wall construction, both walls including an inner side panel wall 90 and an outer side panel wall 100. It is understood that cargo box side walls 34 and 40 may be of a different construction as known by those skilled in the art.

As best seen in FIGS. 3-5, in a preferred example, header panel 20 left hand lateral side portion 66 and right hand lateral side portion 74 are integral with panel main body 50 forming a one-piece, integrated panel extending across the full lateral width of the cargo box connecting to the left 34 and right 40 sidewalls. Referring to FIGS. 4 and 5, header panel 20 includes at least one first side panel engaging surface 80 positioned, for example, on a rear facing surface and extending vertically downward toward the cargo box floor 26. First engaging surface 80 provides a generally planar surface to connect inner sidewall 90 through a flange 98 as best seen in FIG. 5. In a preferred example, flange 98 is resistance spot-welded to header panel 20 at first engagement surface 80 in several places from header panel upper edge 56 beyond floor 26. It is understood that different attachment systems may be used such as mechanical fasteners, adhesives and other bonding mechanisms and structural attachment schemes. As best seen in FIG. 5, this joint preferably consists of only two thicknesses of sheet metal, 66 and 98, which is an improvement over some prior designs that included up to four thicknesses which added complexity to assembly operations of the cargo box and may weaken the sheet metal and welds.

Referring to FIGS. 4 and 5, in one example, header panel 20 further includes at least one second side panel engaging surface 86 for use in structurally connecting header panel 20 to the side panel outer wall 100. In a preferred example, left hand lateral side portion 66 includes a flange portion 84 bending almost 180 degrees around on itself to form second side panel engaging surface 86. In an example, second engaging surface 86 provides a generally planar surface and forms an acute angle 88 with main body portion 50 positioned about 2-7 degrees therefrom. In a preferred example, angle 88 is approximately 3 degrees. It is understood that greater or lesser angles 88 may be used as known by those skilled in the art for efficient manufacturing and assembly. The thickness of flange portion 84, brace 120 and outer wall 100 may be optimized in total thickness to maximize weld strength. A preferred maximum total metal thickness is less than 4.7 millimeters at the second panel engaging surface. The header panel 20 with integrated lateral side portions 66 and 74 provides a more robust design which is easier overall to manufacture and assemble over prior designs.

Outer sidewall 100 includes a flange 108 positioned adjacent a front end 104. In a preferred example, flange 108 is resistance spot-welded to second engaging surface 86 at several points vertically spaced from header upper edge 56 beyond floor 26. Other fastening mechanisms can be used as explained above. A similar structural and attachment scheme may be used for header panel 20 on the right hand lateral side portion 74 to cargo box right side panel 40 (not shown). Floor 26 is connected to header panel 20 and left 34 and right 40 side panels through flanges and spot welding (not shown) as generally known by those skilled in the art. It is understood that other shapes and orientation of the lateral side flange portion 84, flange 108 and second engagement surface 86 may be used without deviating from the present invention.

Figure 6:
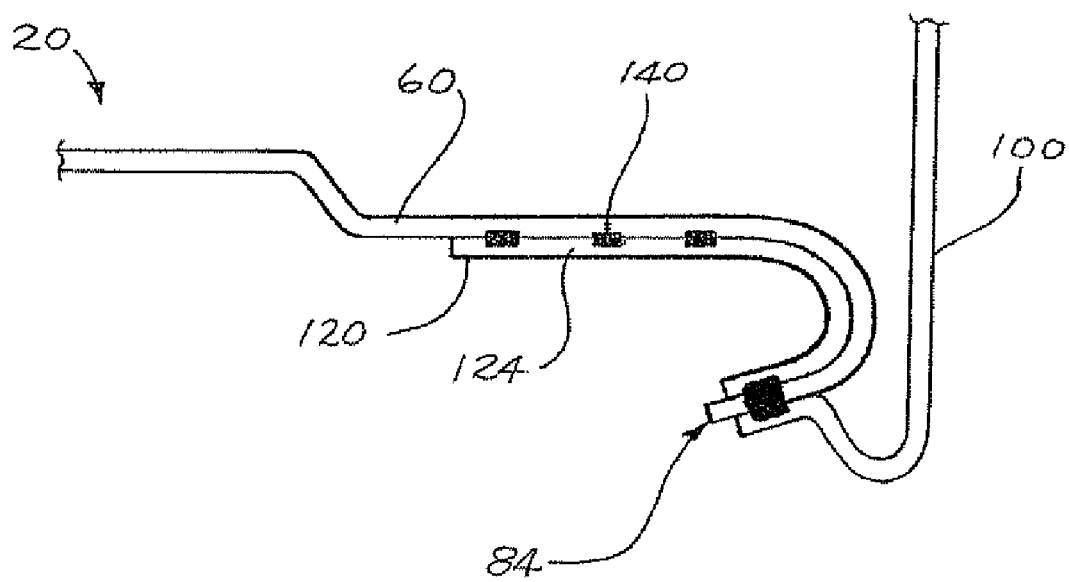
FIG. 6 is a cross-sectional view of the cargo box taken along line 6-6 in FIG. 2.

Referring to FIGS. 2-4, in one example, cargo box 20 further includes a brace 120 positioned adjacent each of left 66 and right 74 lateral sides of header panel 20. Each brace 120 includes an upper portion 124, and elongated side 128 and a forward facing flange 130 as best seen in FIG. 4. As best seen in FIG. 4 and, in a preferred example, at least brace 120 upper portion 124 is preferably sized and shaped to substantially align with the inner contour of lateral side flange portion 84 which it attaches to. The downwardly extending remainder of brace 120 may take many forms suitable for direct connection to outer side panel 100. In a preferred example, brace 120 has a "U" or general scoop-like shape to provide a substantially rigid and robust mounting surface for outer side panel 100 and header panel lower edge 60. As best seen in FIG. 6, in a preferred example, brace 120 is spot welded along upper portion 124 to header panel lower edge 60 in several places 140 as generally shown. Brace 120 is further spot welded to left hand lateral side 66 along a forward facing portion 130. Brace 120 is further connected to side panel 34 and preferably spot welded to side panel outer wall 100 along elongated edge 128 eliminating the prior need for connecting rods or straps (not shown) to structurally support the downward standing outer side wall. A brace 120 is similarly attached to second lateral side 74 (not shown). It is understood that different shapes and attaching methods may be used for brace 120 as known by those skilled in the art.

In one example, brace 120 is manufactured from cold-rolled low carbon steel in a thickness of about 0.8 to 1.7 millimeters thick. In a preferred example, brace 120 is approximately 1.4 millimeters thick. The ability to vary, and in particular to locally increase, the thickness or gage of brace 120 without having to increase the thickness of the header panel provides a significant advantage over the prior practice of using large vertical reinforcements to connect the header panel to the side panels, or the entire header panel 20. In extending the lateral width of the header panel 20 and attaching it directly to the side panels 24 and 40 without the use of additional lateral reinforcements or bolt on brackets, significant advantages are achieved including a reduction of components, reduction of weight, and ease of manufacturing and assembly. Through use of brace 120 positioned and configured as described and illustrated, eliminates the prior need for a separate tie rod or reinforcement struts or straps which adds to the advantages previously described. It is understood that different materials and thickness may be used as understood by those skilled in the art.

In a further preferred example, brace 120 is positioned adjacent the lower edge of the header panel side lateral portions such that the majority of the mass or weight of brace 120 is positioned below the lower edge 60 of header panel 20. In prior designs, large vertical reinforcements and brackets were needed to connect and reinforce the joint between the header panel 20 and the side panels 34 and 40. In some instances up to four thickness welds or extra mechanical fasteners were necessary which is disadvantageous for assembling and securing the separate components together. The gage necessary on the lower portion of such vertical reinforcements needed to support the separate tie rods to the outer portions of the side panels dictated the gage for the integral upper portions or the entire header panel altogether. Through brace 120, a relatively small, thicker gage part can be used instead of increasing the gage of the much larger header panel. In a preferred example, except for the brace 120 edge or upper portion 124 attached to header panel lower edge 60, the entirety of brace 120 may be positioned below header panel 20 to connect directly to the outer side panel 100 without increasing the gage of the portion of the header panel directly above it and the overall header panel 20.

In a preferred method of assembly, one-piece header panel 20 including left 66 and right 74 lateral side portions extending across the width of the cargo box is provided. One or more reinforcements 54, and/or brackets and plates previously described, may be attached to header panel main body portion or the side portions as needed. Left 66 and right 74 lateral side portions preferably include at least one first engaging surface 80 and a lateral side flange portion 84 having at least one second engaging surface 86 for structural connection to cargo box side panels 34 and 40 having inner 90 and outer 100 walls. Brace 120 is further connected to the header panel 20 and outer side panels 100 without using or further connecting to separate support rods or straps. All of the panels are preferably spot welded together wherein no component joint exceeds more than three metal thicknesses at any one spot weld. The header panel 20 and sidewalls are connected to floor 26 and appropriately coated for corrosion resistance and finished to complete cargo box 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cargo box for a vehicle, comprising:
   a header panel having upper and lower edges defining therebetween a generally planar portion, and having at least one substantially vertical lateral side portion extending from and integral with the generally planar portion for connection to at least one outer side panel; and
   a brace connected to the lower edge of the header panel lateral side portion and to at least a portion of the side panel at a location below the lower edge of the header panel, the brace configured so that a majority of the mass of the brace is below the lower edge of the header panel.

2. A cargo box for a vehicle, comprising:
   a header panel having upper and lower edges defining therebetween a generally planar portion, and having at least one lateral side portion extending from and integral with the generally planar portion for connection to at least one side panel, and
   a brace connected to the lower edge of the header panel lateral side portion and to at least a portion of the side panel at a location below the lower edge of the header panel, the brace configured so that a majority of the mass of the brace is below the lower edge of the header panel and wherein the lateral side portion defines at least a first side panel engagement surface and a second side panel engagement surface and wherein a least one side panel is connected to the header panel to form a forward corner of the cargo box, the side panel having an inner wall and an outer wall, each of the inner wall and the outer wall defining at its respective front end at least one header panel engagement surface that is connected to at least one of the first and the second header engagement surfaces.

3. A cargo box for a vehicle, comprising:
   a header panel having upper and lower edges defining therebetween a center portion, and having at least one lateral side portion extending from and integral with the center portion for connection to at least one outer side panel, and
   a brace having an upper header panel connecting portion and a forward extending side panel connecting portion, the brace header panel connecting portion is connected to the lower edge of the header panel lateral side portion and the brace side panel connecting portion is connected to at least an inwardly extending outer side panel portion at a location below the lower edge of the header panel, the brace is configured so that a majority of the mass of the brace is below the lower edge of the header panel.

4. The cargo box of claim 2, wherein the brace is formed of sheet metal having a thickness of at least 0.8 millimeters.

5. The cargo box of claim 2, wherein the at least one lateral side portion of the header panel is configured so that the first side panel engagement surface defines a planar surface that is parallel to but spaced apart from the generally planar portion of the header panel.

6. The cargo box of claim 2, wherein the at least one lateral side portion of the header panel is configured so that the second side panel engagement surface defines a planar surface that forms an acute angle with the generally planar portion of the header panel.

7. The cargo box of claim 6, wherein the acute angle is within the range of about 2 degrees to about 7 degrees.

8. A cargo box for a vehicle, comprising:
   a left sidewall and right sidewall defining a left and a right side of the cargo box respectively, each sidewall having front and rear ends;
   a cargo box floor spanning the left and the right sidewalls;
   a header panel having a main body spanning the front ends of the left and right sidewalls to form a front side of the cargo box, the header panel including an upper and a lower edge and a left lateral side and a right lateral side extending from and integral with the main body, wherein each of the left and the right lateral sides is connected to the adjacent one of the left and the right sidewalls; and
   a left brace and a right brace, each connected to the lower edge of the header panel and to the adjacent one of the left and the right sidewalls at a location below the lower edge of the header panel and the cargo box floor, each of the left and the right braces configured so that a majority of the mass of the brace is below the lower edge of the header panel.

9. The cargo box of claim 8, wherein the left and the right braces are each formed of sheet metal having a thickness greater than the thickness of the left and the right lateral sides of the header panel.

10. The cargo box of claim 9, wherein the left and right braces are formed of sheet metal having a thickness of between about 0.8-2.0 millimeters.

11. The cargo box of claim 8, wherein each of the left and the right lateral sides of the header panel define at least one generally planar surface that is connected to the adjacent one of the left and the right sidewalls.

12. The cargo box of claim 11, wherein the generally planar surface is parallel to but spaced apart from the main body of the header panel.

13. The cargo box of claim 11, wherein the generally planar surface forms an acute angle with the main body of the header panel.

14. The cargo box of claim 13, wherein the acute angle is within the range of about 2 degrees to about 7 degrees.

15. The cargo box of claim 8, wherein at least one of the right and the left lateral sides of the header panel include a flange portion integrally formed in the header panel.

16. The cargo box of claim 15, wherein at least one of the left and the right side panels attaches directly to the flange portion.

17. A method for assembling a cargo box for use in a vehicle, comprising the steps of:
   providing a header panel having an upper edge and a lower edge defining therebetween a generally planar portion, the header having a u-shaped lateral side extending from and integral with the generally planar portion;
   providing a side panel having a front end;
   connecting the front end of the side panel to the lateral side of the header panel to form a corner of the cargo box;
   providing a brace having a u-shaped upper end and an elongated side; and connecting the u-shaped upper end of the brace to the lower edge of the u-shaped lateral side of the header panel and connecting the side of the brace to a portion of the side panel below the lower edge of the header panel, so that a majority of the mass of the brace is below the lower edge of the header panel.

18. A method for assembling a cargo box for use in a vehicle, comprising the steps of:
providing a header panel having an upper edge and a lower edge defining therebetween a center portion, the header having a lateral side extending from and integral with the center portion;
providing an outer side panel having a front end;
connecting the front end of the outer side panel to the lateral side of the header panel to form a corner of the cargo box;
providing a brace having an upper header panel connecting portion and an elongated downwardly extending outer side panel connection portion; and
connecting the brace upper header panel connecting portion to the lower edge of the header panel and connecting the brace side panel connection portion to an inwardly extending portion of the outer side panel below the lower edge of the header panel, so that a majority of the mass of the brace is below the lower edge of the header panel.

19. The method of claim 18, wherein the front end of the outer side panel is connected directly to the lateral side of the header panel without any intervening parts other than the brace.

20. A cargo box for a vehicle comprising:
a header panel having upper and lower edges defining therebetween a center portion, and having at least one lateral side portion extending from and integral with the center portion for connection to at least one side panel, the lateral side portion having a u-shaped lower end; and
a brace having a u-shaped upper portion is positioned in substantial nested alignment with and connected to the u-shaped lower end of the later side portion, the brace further connecting to at least a portion of the side panel at a location below the lower edge of the header panel, the brace configured so that a majority of the mass of the brace is below the lower edge of the header panel.

21. The cargo box of claim 1 wherein the lateral side portion extends the full distance between the header panel upper and lower edges.

22. The cargo box of claim 1 wherein the at least one outer side panel further comprises an opposing outer side panel defining a cargo box width between the outer side panels, wherein the header integral planar portion and the lateral side portion extend substantially the full width of the cargo box.

23. The cargo box of claim 1 further comprising an inner side panel positioned laterally inboard of the outer side panel, wherein the integral header panel connects to the inner side panel and the lateral side portion extends laterally outward to the outer side panel and connects directly to the outer side panel.

24. The cargo box of claim 23 wherein the lateral side portion extends to the outer side panel in substantially the same plane as the header panel planar portion.

25. The cargo box of claim 23 wherein the lateral side portion is offset from the header planar portion and extends to the outer side panel in a plane substantially parallel to the header panel planar portion.

* * * * *